(12) United States Patent
Hovis

(10) Patent No.: US 7,621,459 B2
(45) Date of Patent: Nov. 24, 2009

(54) CONCENTRIC-RING CIRCULAR BAR CODE

(75) Inventor: Gregory Hovis, Martinez, GA (US)

(73) Assignee: Direct Measurements Inc., Atlanta, GA (US)

( * ) Notice: Subject to any disclaimer, the term of this patent is extended or adjusted under 35 U.S.C. 154(b) by 170 days.

(21) Appl. No.: 11/725,564

(22) Filed: Mar. 20, 2007

(65) Prior Publication Data

US 2007/0278316 A1    Dec. 6, 2007

Related U.S. Application Data

(63) Continuation of application No. PCT/US2005/014099, filed on Apr. 25, 2005.

(51) Int. Cl.
  *G06K 7/10* (2006.01)
  *G06K 19/06* (2006.01)
(52) U.S. Cl. ............. 235/494; 235/462.03; 235/462.04; 235/454
(58) Field of Classification Search ............ 235/462.03, 235/462.04, 494, 454
  See application file for complete search history.

(56) References Cited

U.S. PATENT DOCUMENTS

| | | | |
|---|---|---|---|
| 5,241,166 A * | 8/1993 | Chandler | 235/494 |
| 5,260,556 A * | 11/1993 | Lake et al. | 235/494 |
| 5,554,841 A | 9/1996 | Kost et al. | |
| 5,798,514 A | 8/1998 | Domanik | |
| 5,852,434 A * | 12/1998 | Sekendur | 345/179 |
| 5,861,613 A | 1/1999 | Apelberg et al. | |
| 5,969,322 A * | 10/1999 | Mori et al. | 235/462.01 |
| 7,398,928 B2 * | 7/2008 | Gaspard et al. | 235/462.03 |
| 2004/0028258 A1 | 2/2004 | Naimark | |
| 2005/0269412 A1* | 12/2005 | Chiu et al. | 235/462.03 |

OTHER PUBLICATIONS

R. Adams, "Bar Code 1 2-Dimensional Bar Code Page," Adams Communications, Aug. 27, 2003.

* cited by examiner

*Primary Examiner*—Thien M. Le
*Assistant Examiner*—Tuyen K Vo
(74) *Attorney, Agent, or Firm*—Jacobson Holman PLLC

(57) ABSTRACT

A circular bar code includes at least one circular data ring having a plurality of data cells arranged side-by-side in a circle, a circular locator ring of a solid color and conveying the location and size of the bar code to a reading device; and a locator cell conveying the orientation of the bar code to the reading device. The locator ring and the at least one data ring have a finite width, and are concentric, without any gap between adjacent rings. The locator ring can be either inside or outside of the at least one data ring. The locator cell is defined by a gap in the locator ring and a single data cell located in a data ring adjacent the locator ring. The circumferential and radial dimensions of the locator cell convey the data cell size to the reading device.

18 Claims, 7 Drawing Sheets

CONCENTRIC-RING CIRCULAR BAR CODE

CROSS-REFERENCE TO RELATED APPLICATIONS

The present patent application is a continuation of International Application No. PCT/US2005/014099, filed Apr. 25, 2005, which claims priority of provisional Application No. 60/564,939, filed Apr. 26, 2004, both of which are incorporated herein by reference in their entireties.

BACKGROUND OF THE INVENTION

1. Field of the Invention

The present invention relates to high data capacity bar codes. More specifically, the invention relates to a high-data capacity bar code geometry that utilizes data cells in multiple concentric circular rings.

2. Related Art

Bar codes are "machine readable" markings that are used to encode and store information in a normal geometric pattern, or compressed symbol. Possibly the most familiar bar code is the one-dimensional (1D) pattern of alternating black and white bars found on labels and price tags of nearly every consumer item (commonly referred to as a universal price code or UPC).

The need to store greater amounts of information in a compact symbol gave rise to two-dimensional (or 2D) bar codes. Early 2D bar codes were simply multiple rows of 1D bar codes. Matrix-type codes later evolved with black and white dots or squares arranged in a regular rectangular pattern. Today there are a variety of 2D bar code patterns. Examples are 3-DI, Aztex, Codablock, Code 1, Code 16K, Code 49, CP Code, DataGlyph, DataMatrix, Datastrip Code, Dot Code A, Hue Code, Intacta Code, MaxiCode, MiniCode, PDF 417, QR Code, SmartCode, Snowflake Code, SuperCode, and UltraCode. Of the 2D bar codes listed above, only the 3-DI code (described in U.S. Pat. No. 5,554,841 assigned to Lynn Ltd.) is based on a circular geometry. DMI is aware of an additional circular bar code (U.S. Pat. No. 5,798,514) that utilizes lengths of opposing radial "teeth" to encode data.

While a variety of bar code configurations exist today, the inventor and his assignee (Direct Measurement Inc.) have identified a need for a high-data capacity circular bar code with certain geometric properties not presently available in existing bar code configurations.

It is to the solution of these and other problems that the present invention is directed.

SUMMARY OF THE INVENTION

It is accordingly a primary object of the present invention to provide a high-data capacity circular bar code with certain geometric properties not presently available in existing bar code configurations.

This and other object of the invention are achieved by a circular bar code comprising at least one data ring, each data ring comprising a plurality of data cells arranged side-by-side in a circle, a locator ring, the locator ring being a solid color and conveying the location and size of the bar code to a reading device, and a locator cell conveying the orientation of the bar code to the reading device. The locator ring and the at least one data ring are circular, have a finite width, and are concentric, without any gap between adjacent rings.

In one aspect of the invention, the locator cell is defined by a gap in the locator ring and a single data cell located in a data ring adjacent the locator ring, the single data cell being adjacent the gap and the same color as the locator ring. The circumferential and radial dimensions of the locator cell convey the data cell size to the reading device.

In another aspect of the invention, the locator ring can be either inside or outside of the at least one data ring.

In still another aspect of the invention, the circular bar code can have either a positive or a negative color scheme.

Each data cell is a binary storage location. A data cell of the same color as the locator ring has a value of "1" and a data cell of the opposite color as the locator ring has a value of "0."

In still another aspect of the invention, the locator ring and the at least one data ring together define a symbol area, and wherein the circular bar code further comprises inner and outer quiet regions immediately inside and outside the symbol area for providing background contrast to enable the reading device to properly locate, identify, and read data in the bar code.

The capacity of the circular bar code equals ((number of data rings) (number of data cells per ring))−1.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
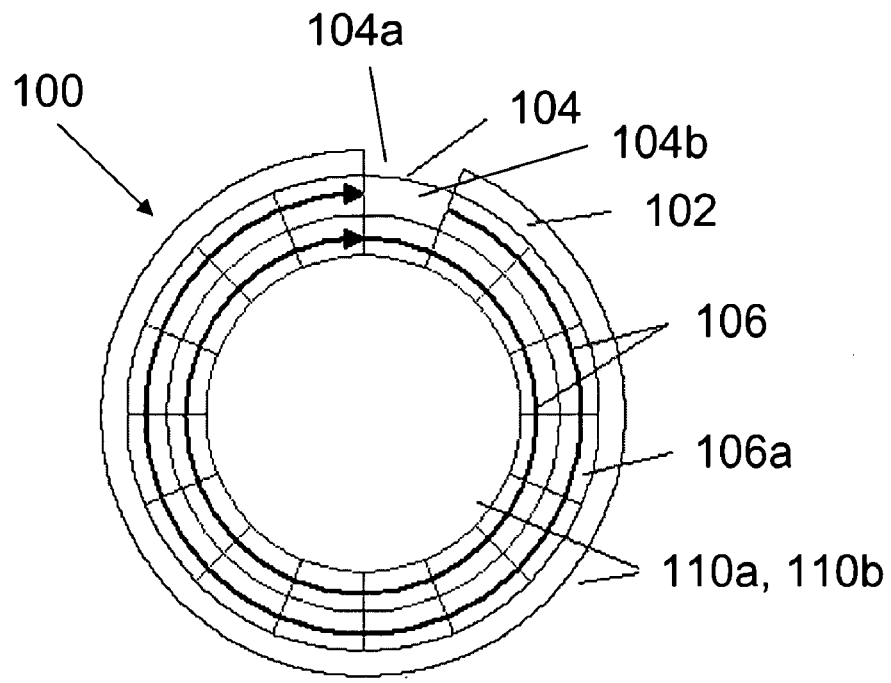
FIG. 1 illustrates a generic example of a circular bar code configuration comprising concentric circular rings.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is directed to a circular bar code configuration comprising concentric circular rings. A generic example 100 is shown in FIG. 1.

The concentric-ring circular bar code 100 is made-up of a locator ring 102, a locator cell 104, and one or more data rings 106. Each locator ring 102 and data ring 106 is circular and has a finite width. All rings 102 and 106 are concentric and there is no gap or space between rings.

Data rings 106 are groups of side-by-side data cells 106a arranged in a circle. A concentric-ring circular bar code 100 can contain one or more data rings 106. The example in FIG. 1 has two data rings 106. Each data ring 106 in a particular symbol contains the same number of data cells 106a.

The locator ring 102 is a solid color ring that aids in machine reading by conveying the location and size of the bar code 100 to the reading device. The locator cell 104 conveys the orientation of the bar code 100 to the reading device. The locator cell 104 is a break 104a in the locator ring 102 (the "locator gap") plus a single adjacent data cell 104b of the same color as the locator ring 102. The circumferential and radial dimensions of the locator cell 104 convey the data-cell size to the reading device. The bar code 100 can be arranged such that the locator ring 102 is inside of, or at a smaller diameter than the data rings 106 (referred to as "inner"). Additionally, the locator ring 102 can be outside of, or at a larger diameter than the data rings 106 (referred to as "outer"). The bar code 100 shown in FIG. 1 is an example of the outer-locator ring geometry.

Each data cell 106a is a binary storage location. That is, a data cell 106a has a value of "1" or "0." By definition, a data cell 106a shaded the same color as the locator ring 102 has a value of "1." A data cell 106a shaded the opposite color of the locator ring 102 has a value of "0."

The total storage capability of a concentric-ring circular bar code depends upon the number of data rings 106, and the number of data cells_106a per data ring. The example in FIG. 1 has two data rings 106 and sixteen data cells_106a per ring totaling thirty-two data locations. As described above, the locator gap 104a consumes one of the data locations, which leaves thirty-one available data cells_106a. In general, the storage capacity of a concentric-ring circular bar code is computed as follows:

Capacity=((number of data rings)×(number of data cells per ring))−1

"Quiet regions" are defined as circular regions 110a and 110b immediately adjacent to the extreme radii of the symbol (i.e. immediately inside and outside of the inner and outer circumferences of the symbol area). These regions 110a and 110b assist in machine reading by providing the necessary background contrast to properly locate, identify, and read bar code data.

Figures 2A, 2B:
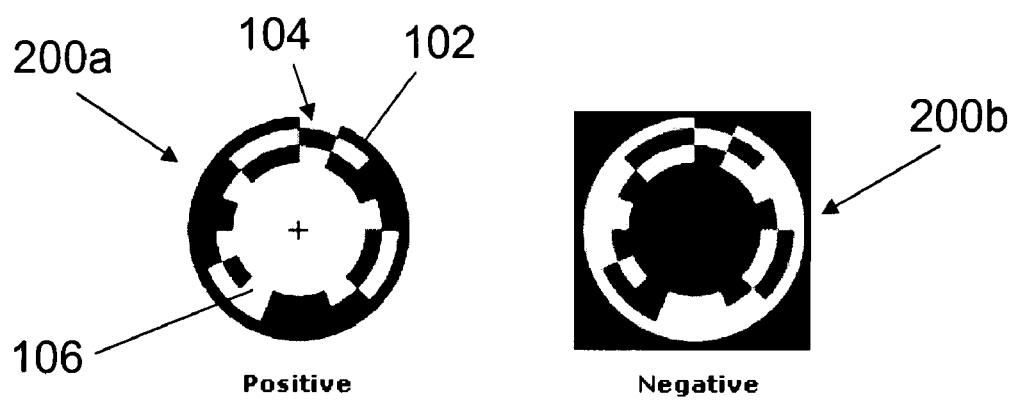
FIGS. 2A and 2B illustrate positive and negative color schemes of the same circular bar code.

Concentric-ring circular bar codes can be formed in "positive" or "negative" color schemes. In a positive color scheme, the locator ring 102 is shaded dark, data cells_106a with value "1" are shaded dark, data cells 106a with value "0" are shaded light, while the quiet regions are either shaded light or have a naturally light appearance. The opposite of these rules is true of negative color schemes. These schemes are depicted by example in FIGS. 2A and 2B, which illustrate positive and negative color schemes 200a and 200b of the same bar code.

Figure 3:
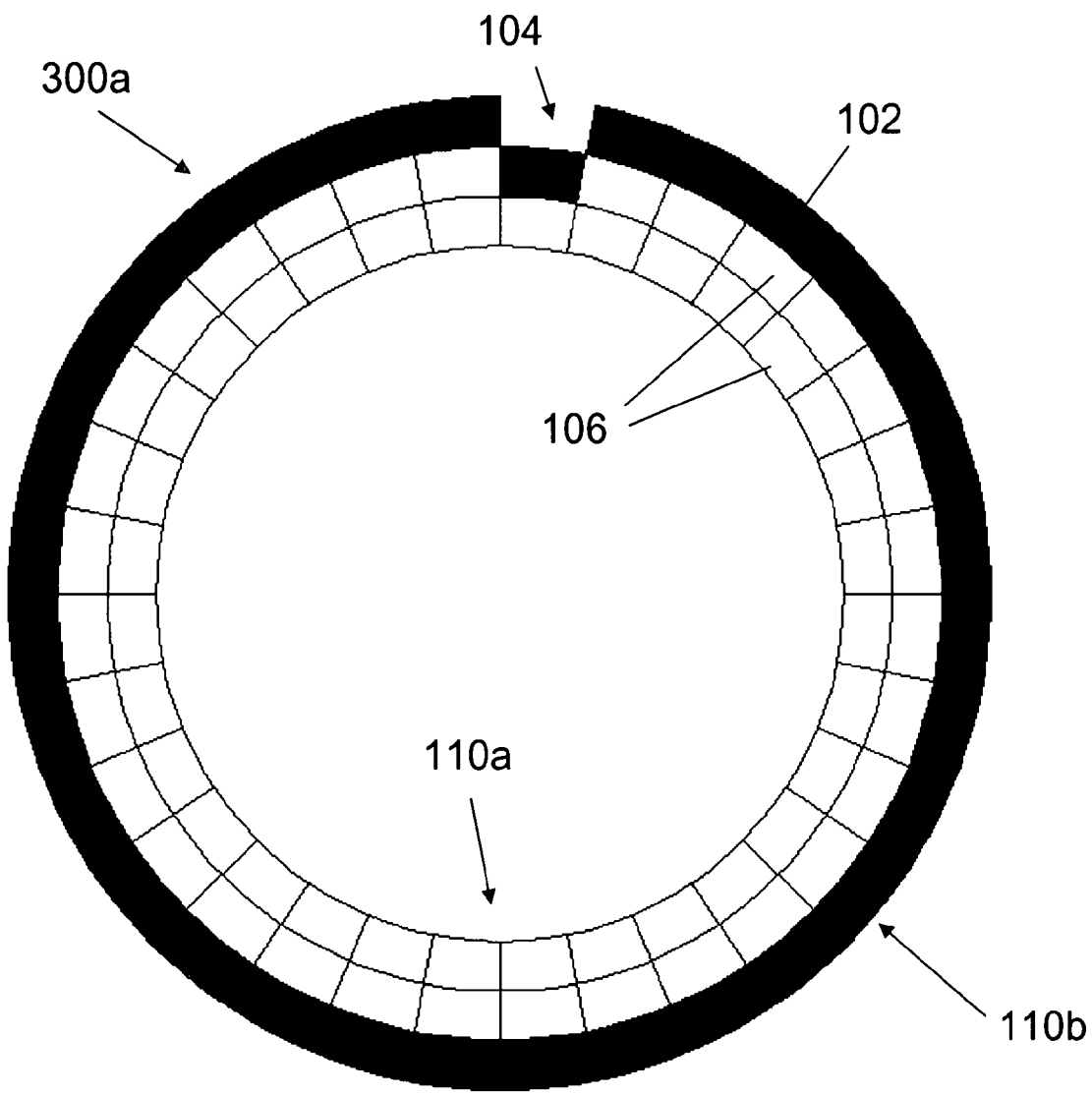
FIG. 3 illustrates a circular bar code layout with an outer locator ring, two data rings, and sixty-three data cells.
Figure 3A:
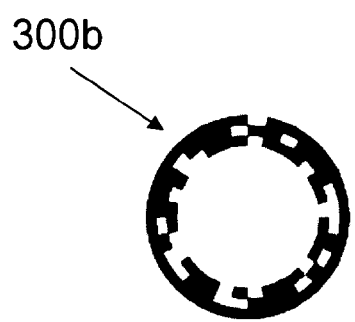
FIG. 3A illustrates a sample-shaded code of the layout of FIG. 3.
Figure 4:
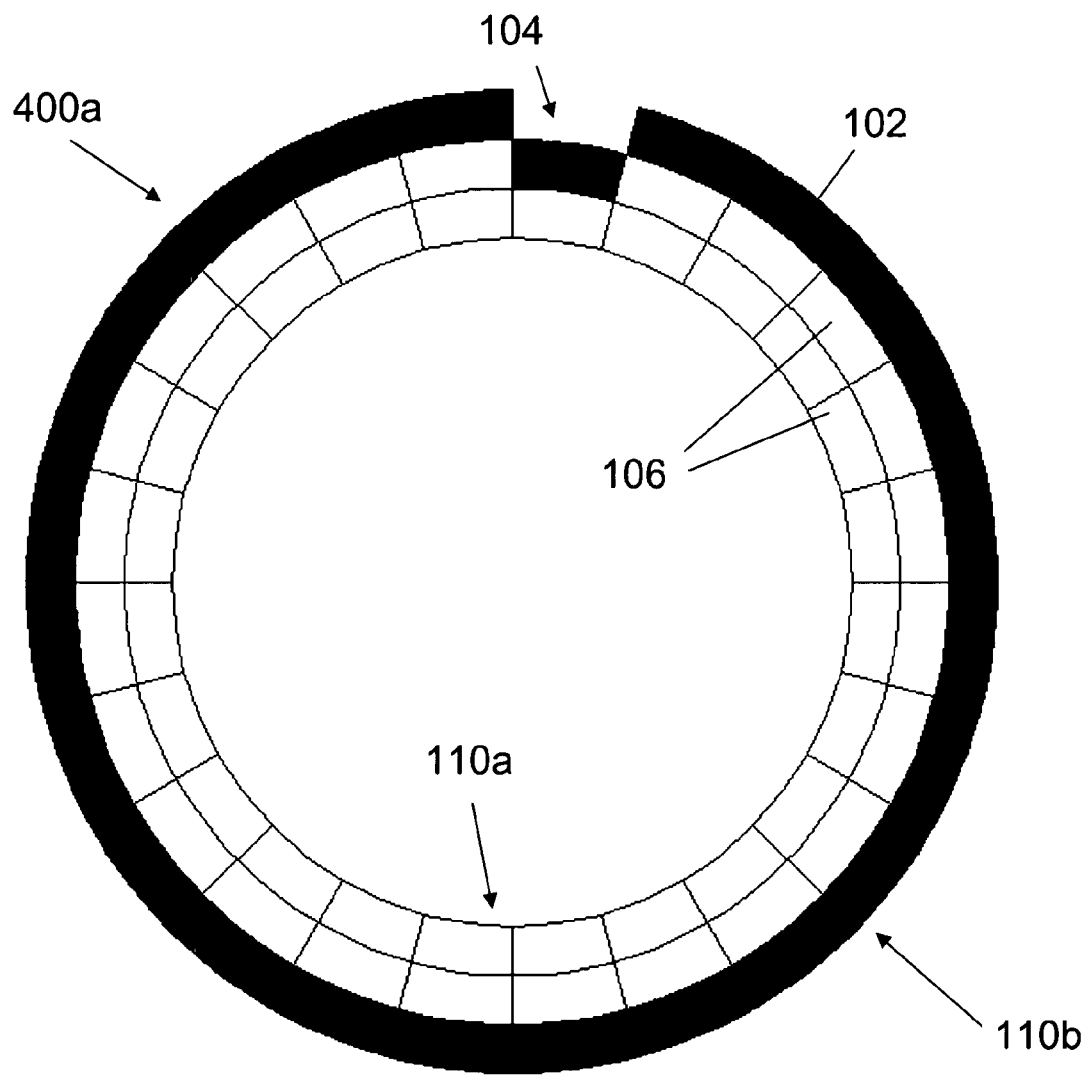
FIG. 4 illustrates a circular bar code layout with an outer locator ring, two data rings, and forty-seven data cells.
Figure 4A:
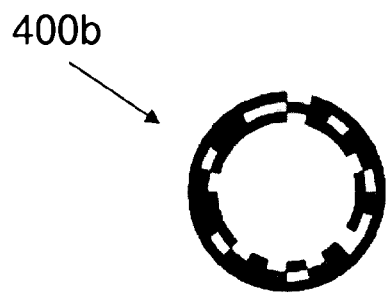
FIG. 4A illustrates a sample-shaded code of the layout of FIG. 4.
Figure 5:
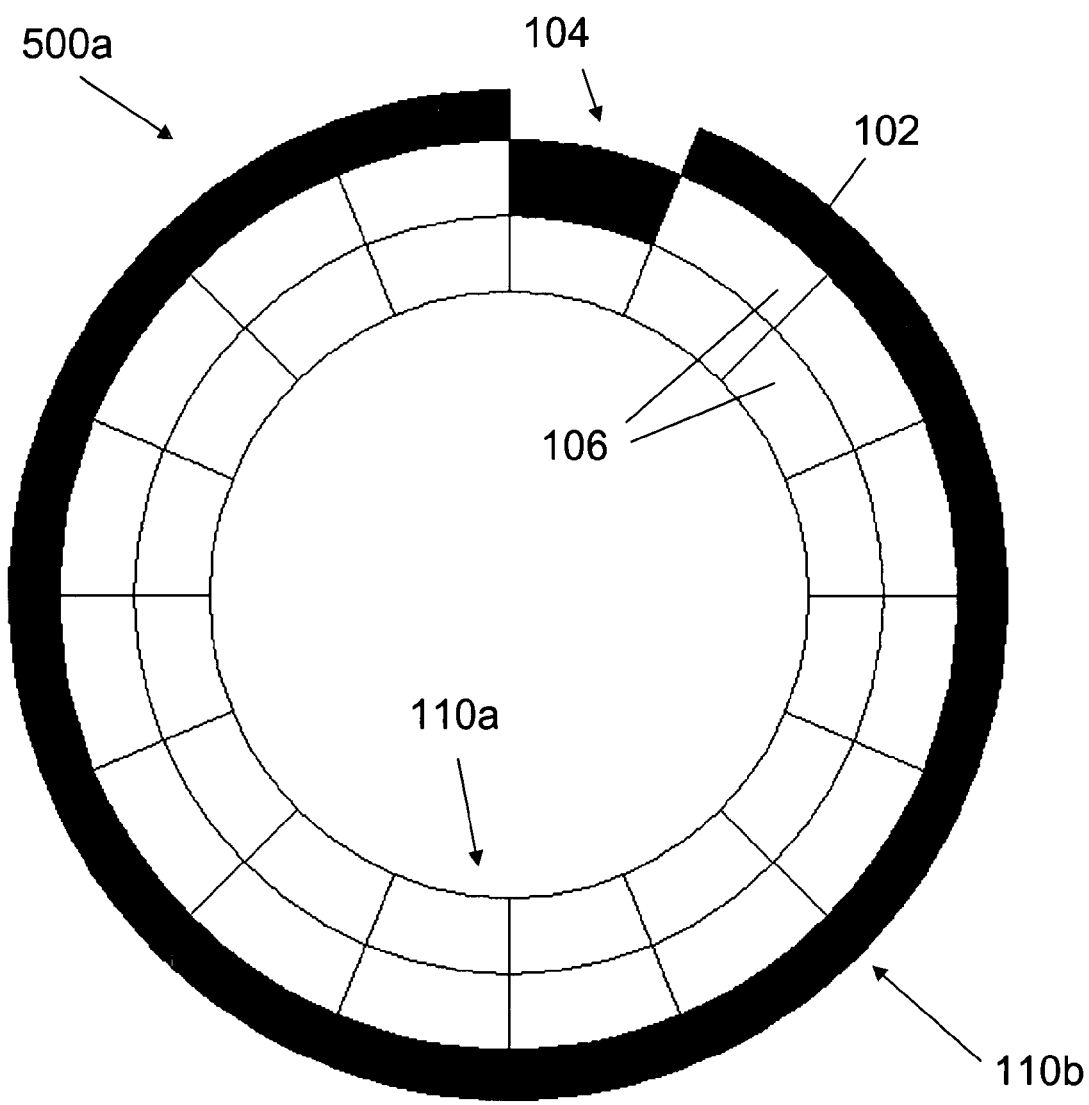
FIG. 5 illustrates a circular bar code layout with outer locator ring, two data rings, and thirty-one data cells.
Figure 5A:
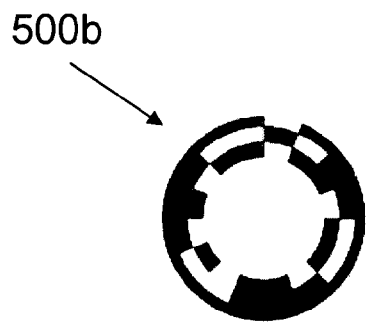
FIG. 5A illustrates a sample-shaded code of the layout of FIG. 5.
Figure 6:
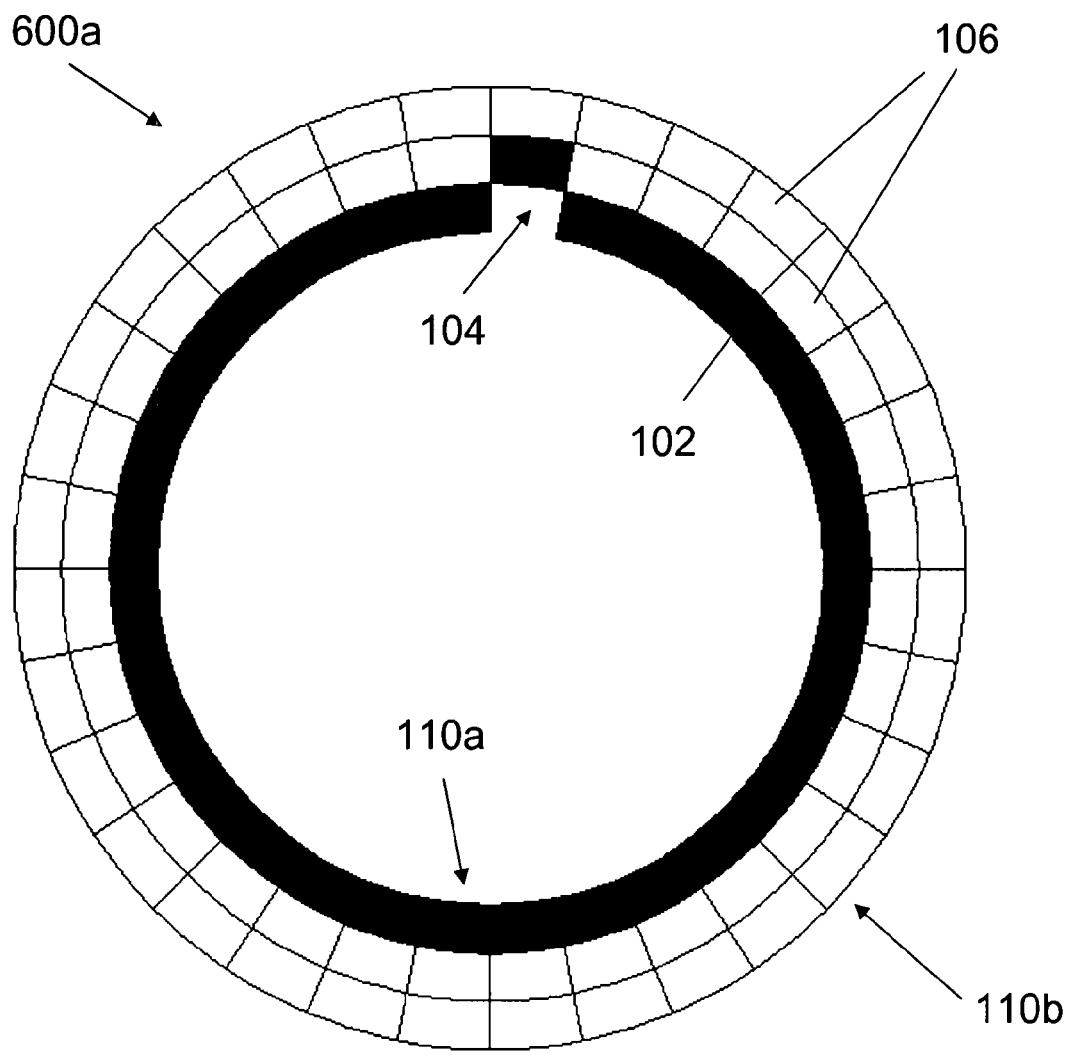
FIG. 6 illustrates a code layout with an inner locator ring, two data rings, and sixty-three data cells.
Figure 6A:
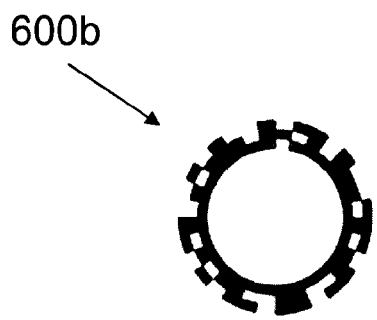
FIG. 6A illustrates a sample-shaded code of the layout of FIG. 6.
Figure 7:
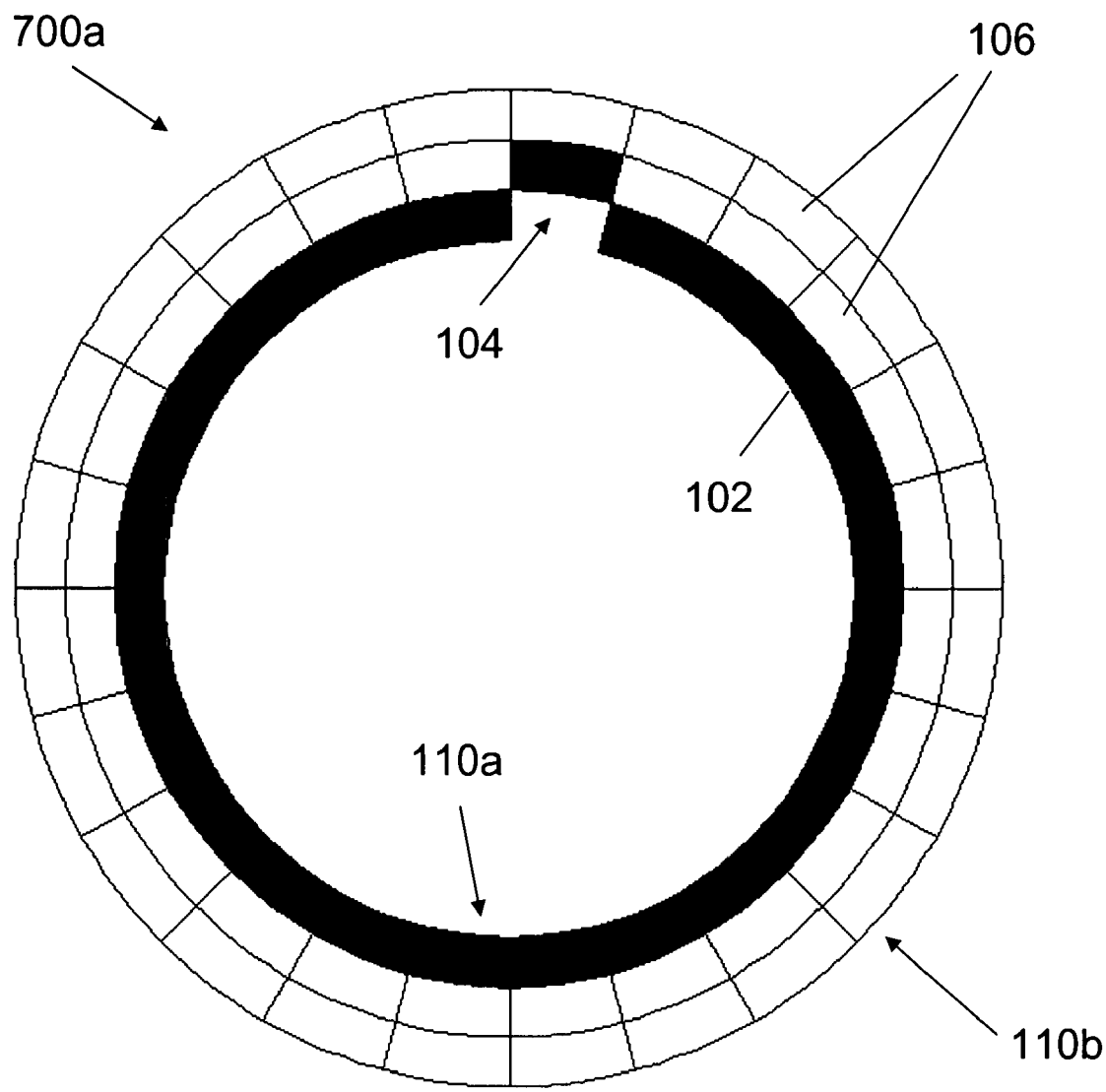
FIG. 7 illustrates a code layout with an inner locator ring, two data rings, and forty-seven data cells.
Figure 7A:
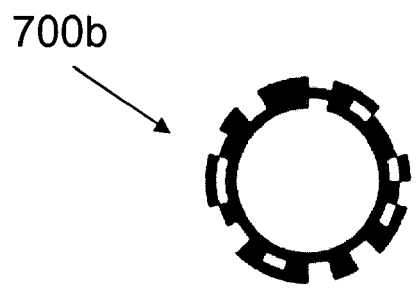
FIG. 7A illustrates a sample-shaded code of the layout of FIG. 7.
Figure 8:
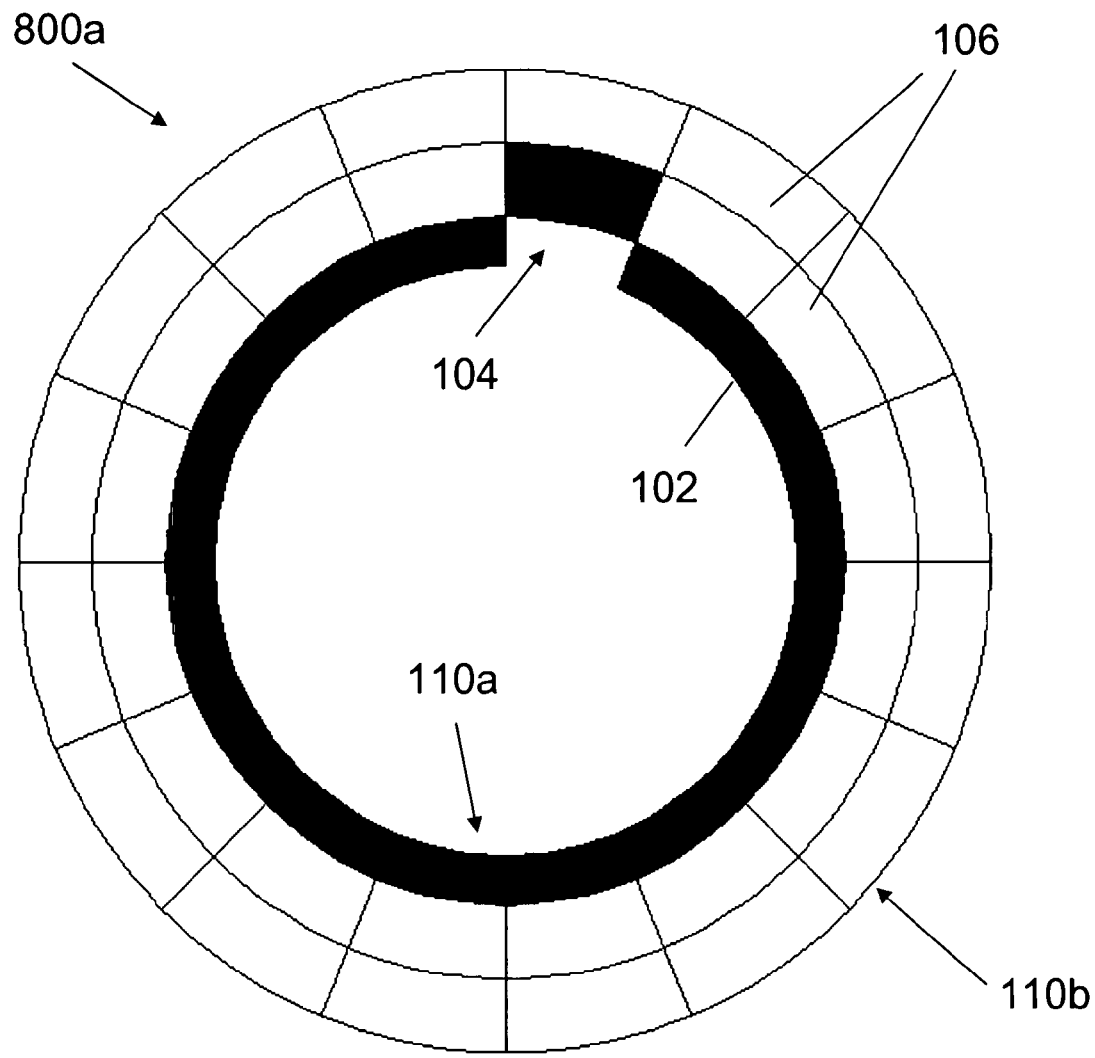
FIG. 8 illustrates a code layout with inner locator ring, two data rings, and thirty-one data cells.

Some example layouts of concentric-ring circular bar codes are provided in FIGS. 3-8. FIGS. 3, 4, and 5 show layouts with an outer locator ring 102, and FIGS. 6, 7, and 8 show layouts with an inner locator ring 102. For each layout, a corresponding sample-shaded code is provided (FIGS. 3A, 4A, 5A, 6A, 7A, and 8A).

Figure 8A:
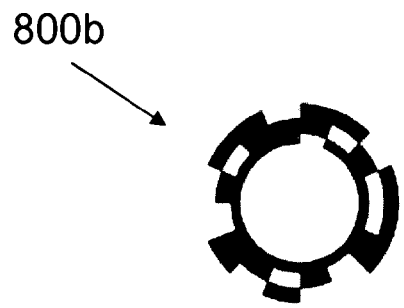
FIG. 8A illustrates a sample-shaded code of the layout of FIG. 8.

In particular, FIGS. 3 and 3A illustrate a code layout 300a with an outer locator ring 102, two data rings 106, and sixty-three data cells_106a and corresponding sample-shaded code 300b; FIGS. 4 and 4A illustrate a code layout 400a with an outer locator ring 102, two data rings 106, and forty-seven data cells 106a and corresponding sample-shaded code 400b; and FIGS. 5 and 5A illustrate a code layout 500a with an outer locator ring 102, two data rings 106, and thirty-one data cells_106a and corresponding sample-shaded code 500b; FIGS. 6 and 6A illustrate a code layout 600a with an inner locator ring 102, two data rings 106, and sixty-three data cells_106a and corresponding sample-shaded code 600b; FIGS. 7 and 7A illustrate a code layout 700a with an inner locator ring 102, two data rings 106, and forty-seven data cells 106a and corresponding sample-shaded code 700b; and FIGS. 8 and 8A illustrate a code layout 800a with an inner locator ring 102, two data rings 106, and thirty-one data cells 106a and corresponding sample-shaded code 800b.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A circular bar code comprising:
   at least one data ring, each data ring comprising a plurality of data cells arranged side-by-side in a circle;
   a locator ring, the locator ring being a solid color and conveying the location and size of the bar code to a reading device; and
   a locator cell conveying the orientation of the bar code to the reading device;
   wherein the locator ring and the at least one data ring are circular, have a finite width, and are concentric, without any gap between adjacent rings; and
   wherein the bar code has a capacity computed as:

Capacity=((number of data rings)×(number of data cells per ring))−1.

2. The circular bar code of claim 1, wherein the locator cell is defined by a gap in the locator ring and a single data cell located in a data ring adjacent the locator ring, the single data cell being adjacent the gap and the same color as the locator ring.

3. The circular bar code of claim 2, wherein the circumferential and radial dimensions of the locator cell convey the data cell size to the reading device.

4. The circular bar code of claim 1, wherein the locator ring is inside the at least one data ring.

5. The circular bar code of claim 1, wherein the locator ring is outside the at least one data ring.

6. The circular bar code of claim 1, wherein the bar code has a positive color scheme.

7. The circular bar code of claim 1, wherein the bar code has a negative color scheme.

8. The circular bar code of claim 1, wherein each data cell is a binary storage location, and wherein a data cell of the same color as the locator ring has a value of "1" and a data cell of the opposite color as the locator ring has a value of "0."

9. The circular bar code of claim 1, wherein the locator ring and the at least one data ring together define a symbol area, and wherein the circular bar code further comprises inner and outer quiet regions immediately inside and outside the symbol area for providing background contrast to enable the reading device to properly locate, identify, and read data in the bar code.

10. A circular bar code comprising:

at least one data ring, each data ring comprising a plurality of data cells arranged side-by-side in a circle;

means for conveying the location and size of the bar code to a reading device; and means for conveying the orientation of the bar code to the reading device;

wherein the at least one data ring is circular and has a finite width; and wherein the bar code has a capacity computed as:

Capacity=((number of data rings)×(number of data cells per ring))−1.

11. The circular bar code of claim 10, wherein the means for conveying the orientation of the bar code has circumferential and radial dimensions for conveying the data cell size to the reading device.

12. The circular bar code of claim 10, further comprising means for providing background contrast to enable the reading device to properly locate, identify, and read data in the bar code.

13. A circular bar code comprising:

at least one data ring, each data ring comprising a plurality of data cells arranged side-by-side in a circle;

a locator ring, the locator ring being a solid color and conveying the location and size of the bar code to a reading device, the locator ring and the at least one data ring together defining a symbol area;

inner and outer quiet regions immediately inside and outside the symbol area for providing background contrast to enable the reading device to properly locate, identify, and read data in the bar code; and a locator cell conveying the orientation of the bar code to the reading device, wherein the locator cell is defined by a gap in the locator ring and a single data cell located in a data ring adjacent the locator ring, the single data cell being adjacent the gap and the same color as the locator ring, and wherein the circumferential and radial dimensions of the locator cell convey the data cell size to the reading device;

wherein the locator ring and the at least one data ring are circular, have a finite width, and are concentric, without any gap between adjacent rings; and wherein the bar code has a capacity computed as:

Capacity=((number of data rings)×(number of data cells per ring))−1.

14. The circular bar code of claim 13, wherein the locator ring is inside the at least one data ring.

15. The circular bar code of claim 13, wherein the locator ring is outside the at least one data ring.

16. The circular bar code of claim 13, wherein the bar code has a positive color scheme.

17. The circular bar code of claim 13, wherein the bar code has a negative color scheme.

18. The circular bar code of claim 13, wherein each data cell is a binary storage location, and wherein a data cell of the same color as the locator ring has a value of "1" and a data cell of the opposite color as the locator ring has a value of "0.

* * * * *